(12) United States Patent
Kumar et al.

(10) Patent No.: US 11,138,047 B2
(45) Date of Patent: Oct. 5, 2021

(54) EFFICIENT NETWORK SERVICES WITH PERFORMANCE LAG PREDICTION AND PREVENTION

(71) Applicant: VMWARE, INC., Palo Alto, CA (US)

(72) Inventors: Vasantha Kumar, Pune (IN); Vaishali Sontakke, Pune (IN); Lakshmi Sravya Koppula, Pune (IN); Stalin Rajakilli, Pune (IN); Zaid Bepari, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/276,647

(22) Filed: Feb. 15, 2019

(65) Prior Publication Data
US 2020/0183753 A1  Jun. 11, 2020

(30) Foreign Application Priority Data
Dec. 5, 2018  (IN) .............................. 201841045970

(51) Int. Cl.
*G06F 9/50* (2006.01)
*H04L 12/24* (2006.01)
*G06F 11/34* (2006.01)
*G06F 9/455* (2018.01)
*G06F 9/48* (2006.01)

(52) U.S. Cl.
CPC ........ *G06F 9/5077* (2013.01); *G06F 9/45558* (2013.01); *G06F 9/4856* (2013.01); *G06F 9/5083* (2013.01); *G06F 11/3428* (2013.01); *H04L 41/147* (2013.01); *G06F 2009/4557* (2013.01); *G06F 2209/5014* (2013.01); *G06F 2209/5019* (2013.01)

(58) Field of Classification Search
CPC .. G06F 9/5077; G06F 9/45558; G06F 9/4856; G06F 9/5083; G06F 11/3428; G06F 2009/4557; G06F 2209/5014; G06F 2209/5019; H04L 41/147
See application file for complete search history.

(56) References Cited

U.S. PATENT DOCUMENTS

| | | | | |
|---|---|---|---|---|
| 8,312,419 | B2 * | 11/2012 | Wilcock | G06F 8/70 717/104 |
| 9,356,883 | B1 * | 5/2016 | Borthakur | H04L 41/5051 |
| 9,600,774 | B1 * | 3/2017 | Biemueller | G06F 9/45533 |
| 9,880,870 | B1 * | 1/2018 | Danilov | G06F 9/45558 |
| 9,928,100 | B2 * | 3/2018 | Dow | G06F 9/45533 |
| 10,402,746 | B2 * | 9/2019 | Eicher | G06N 20/20 |
| 2007/0011444 | A1 * | 1/2007 | Grobman | G06F 9/44547 713/2 |
| 2009/0300173 | A1 * | 12/2009 | Bakman | H04L 41/147 709/224 |

(Continued)

*Primary Examiner* — Blake J Rubin
(74) *Attorney, Agent, or Firm* — Patterson & Sheridan, LLP

(57) ABSTRACT

Embodiments of the present disclosure relate to predicting and preventing performance lag of virtual network appliances. Embodiments include determining a benchmark score for a virtual appliance running on a computing device. Embodiments include providing the benchmark score and one or more virtual appliance settings of the virtual appliance as inputs to a trained predictive model and receiving a predicted performance value as an output from the trained predictive model. Embodiments include using the predicted performance value to perform one or more actions.

20 Claims, 4 Drawing Sheets

(56) References Cited

U.S. PATENT DOCUMENTS

| | | | |
|---|---|---|---|
| 2010/0083248 A1* | 4/2010 | Wood | G06F 9/5077 718/1 |
| 2010/0242045 A1* | 9/2010 | Swamy | G06F 9/4856 718/104 |
| 2011/0219372 A1* | 9/2011 | Agrawal | H04L 67/06 718/1 |
| 2015/0195178 A1* | 7/2015 | Bhattacharya | H04L 45/745 718/1 |
| 2015/0207667 A1* | 7/2015 | Basso | H04L 49/70 709/223 |
| 2017/0322241 A1* | 11/2017 | Tang | H02J 9/06 |
| 2017/0322870 A1* | 11/2017 | Hotra | G06F 11/3664 |
| 2017/0364387 A1* | 12/2017 | Ahmed | G06F 3/067 |
| 2018/0157522 A1* | 6/2018 | Bafna | G06F 9/45558 |
| 2018/0241812 A1* | 8/2018 | Marchetti | H04L 67/1023 |
| 2018/0241843 A1* | 8/2018 | Bardhan | H04L 67/322 |
| 2018/0278496 A1* | 9/2018 | Kulshreshtha | H04L 41/145 |
| 2018/0314616 A1* | 11/2018 | Savolainen | G06F 9/505 |
| 2019/0065265 A1* | 2/2019 | Wang | H04L 43/0894 |
| 2019/0171474 A1* | 6/2019 | Malboubi | G06F 9/45558 |
| 2019/0286475 A1* | 9/2019 | Mani | G06F 9/45558 |
| 2020/0004601 A1* | 1/2020 | Ahmad | G06F 9/4806 |
| 2020/0012509 A1* | 1/2020 | Khan | G06F 9/5077 |
| 2020/0074323 A1* | 3/2020 | Martin | G06Q 10/06313 |
| 2020/0089515 A1* | 3/2020 | Hari | G06N 3/084 |
| 2020/0117494 A1* | 4/2020 | Cortez | G06F 9/4856 |
| 2020/0133702 A1* | 4/2020 | Sharma | G06F 9/5088 |
| 2020/0379914 A1* | 12/2020 | Yudanov | G06F 12/1027 |

* cited by examiner

EFFICIENT NETWORK SERVICES WITH PERFORMANCE LAG PREDICTION AND PREVENTION

RELATED APPLICATIONS

Benefit is claimed under 35 U.S.C. 119(a)-(d) to Foreign Application Serial No. 201841045970 filed in India entitled "EFFICIENT NETWORK SERVICES WITH PERFORMANCE LAG PREDICTION AND PREVENTION", on Dec. 5, 2018, by VMware, Inc., which is herein incorporated in its entirety by reference for all purposes.

BACKGROUND

Conventionally, networking services such as load balancing, firewalls, and routing have been performed by specialized hardware appliances. These physical appliances are generally distributed to customers with various performance metrics (e.g., processing, storage, and communications resource utilization) that customers can use to determine the capabilities and resource requirements of the appliances. For instance a particular router may indicate that it supports a certain amount of network traffic. However, unlike physical network appliances which have known performance metrics, services performed by software components such as virtual network appliances (e.g., virtual router, virtual switch, other virtual appliances, etc.) may be executed with varying configurations on a variety of different hardware components. In such cases, it is often a challenge to determine accurate performance metrics that are applicable to particular circumstances of the implementation, including hardware characteristics of the host, other software that might be running on the host, etc. Without reliable prediction of potential maximum throughput of a network service, it can be difficult to appropriately provision or scale network services to avoid dropped packets resulting from performance lag.

Performance metrics are sometimes published in association with virtual appliances, but these metrics may be of limited utility. For example, the performance of a virtual appliance with a specific combination of configuration values when run on a particular hardware configuration (e.g., the speed and amount of memory, the processor type and amount of physical processor bandwidth allocated or available to the virtual appliance) is not likely to be representative of how the virtual appliance will perform on a customer system with different hardware platform, allocated resources, and under varying execution conditions, such as load. Accordingly, there is a need in the art for improved techniques of determining performance metrics for software-implemented components such as virtual appliances in a SDN.

SUMMARY

Herein described are one or more embodiments of a method for predicting and preventing performance lag of virtual network appliances. The method generally includes: determining a benchmark score for a virtual appliance running on a computing device with a particular hardware configuration; providing the benchmark score and one or more configuration values of the virtual appliance as inputs to a trained predictive model; receiving a predicted performance value as an output from the trained predictive model; and, based on the predicted performance value, performing one or more actions, at least one of which is selected from the following list: generating a notification related to the virtual appliance; migrating the virtual appliance from a first host to a second host; or modifying a resource allocation amount related to the virtual appliance.

Also described herein are embodiments of a computer system, wherein software for the computer system is programmed to execute the method described above for predicting and preventing performance lag of virtual network appliances.

Also described herein are embodiments of a non-transitory computer readable medium comprising instructions to be executed in a computer system, wherein the instructions when executed in the computer system perform the method described above for predicting and preventing performance lag of virtual network appliances.

DETAILED DESCRIPTION

Figure 1:
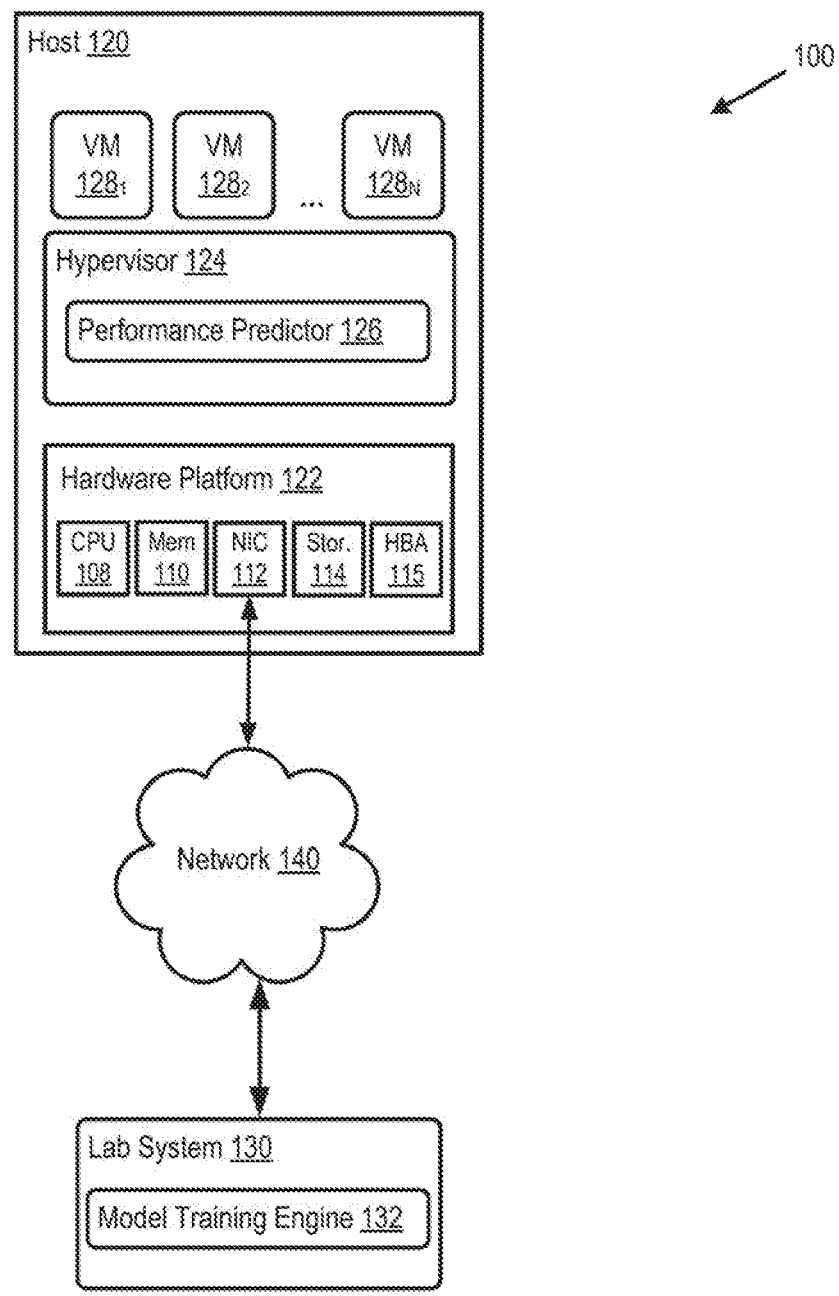
FIG. 1 illustrates components of an example computing environment in which embodiments may be implemented.

Embodiments presented herein relate to techniques for predicting performance of virtual appliances. Virtual appliances may, for instance, be virtual machines configured to perform certain services. In certain embodiments, a predictive model is trained using performance metrics measured in a "laboratory" or trial setting to predict performance of a virtual appliance. An important aspect of generating predictions is collecting input parameters that directly affect an output. In the present case, a virtual appliance's performance (which is the output of the predictive model) greatly depends on the network hardware (e.g., network interface controller), CPU, and memory of computing devices that are used for implementing the virtual appliance, as well as virtual appliance settings (e.g., configured by a user via a hypervisor) such as resource reservation amounts, firewall, network address translation (NAT) rule counts, and others. Because there are a vast number of virtual appliance settings possible with hardware platforms (e.g., processors, memory, network interface controllers, and other components) from different vendors, it would be inefficient and costly, if not impossible, to actually measure performance metrics of a virtual appliance for all possible hardware platforms and virtual appliance settings in advance. Accordingly, techniques described herein involve determining benchmark scores for hardware platforms at different virtual appliance settings, measuring performance metrics at different benchmark scores, and storing the performance metrics in association with the benchmark scores for use in training a predictive model to predict future performance of a virtual appliance.

A benchmark score generally represents a number of operations that can be performed on a given hardware platform with given virtual appliance settings within a time period, such as a number of encryption or decryption operations that can be performed per second. Virtual appliance settings may, for instance, include a resource reservation amount such as an amount of CPU, memory, network bandwidth, disk I/O, or Graphics Processing Unit (GPU) resources that are reserved for a virtual appliance. It is noted that a reservation amount generally represents a minimum amount of a resource that is guaranteed to be available to the virtual appliance, and the virtual appliance may in fact utilize more than this amount of the resource depending upon resource availability (e.g., if the load on the resource from other entities is low). As such, in some embodiments, virtual appliance settings include a maximum and/or minimum amount of a resource to be used by a virtual appliance (e.g., which may be controlled by a hypervisor).

In certain embodiments, a benchmark score is determined for a certain hardware platform with certain virtual appliance settings by running a benchmark program that performs a series of operations using the virtual appliance and determines a number of the operations completed in a time period. For instance, virtual appliance settings may specify that a virtual appliance is to operate above a minimum CPU amount and below a maximum CPU amount, and a benchmark score may therefore be determined for a particular CPU amount. Performance metrics (e.g., CPU utilization and/or memory utilization) are then collected for the virtual appliance running on the hardware platform with the virtual appliance settings. Virtual appliance settings may also include firewall rules, NAT rule counts, algorithm selections, and other types of settings. The performance metrics are stored in association with the benchmark score, and also in association with the virtual appliance settings. For example, performance metrics may be collected for a plurality of virtual appliances running on different hardware platforms and with different virtual appliance settings in a laboratory environment, and the performance metrics may be associated with respective benchmark scores and virtual appliance settings for the purposes of training a predictive model.

Determining benchmark scores as described herein is a separate process from measuring performance metrics. A benchmark score is determined once for a given combination of hardware platform and virtual appliance settings and is associated with all performance metrics captured for a virtual appliance of a certain type that utilizes the given hardware platform and virtual appliance settings. Benchmark scores may be based on different operations for different types of virtual appliances. For instance, a benchmark score for a security-related virtual appliance may be a number of encryption or decryption operations performed in a given time period. Alternatively, a benchmark score for a virtual appliance that primarily performs operations related to network communications may be a number of network interface controller (NIC) operations performed in a given time period.

Performance metrics associated with benchmark scores and virtual appliance settings are used as training data for a predictive model. For example, generating training data for a given virtual appliance may involve running a virtual appliance on the same hardware platform using different virtual appliance settings (e.g., the same processor with varying reservation amounts and varying firewall rules and other settings), measuring performance metrics at each combination of hardware platform and virtual appliance settings, and associating the performance metrics with the benchmark scores representing the different combinations. As such, training data generated on a single set of hardware platforms can be abstracted (e.g., based on benchmark scores) to a variety of different hardware platforms.

Performance metrics generally include resource utilization, such as central processing unit (CPU) and memory utilization, as well as other metrics such as upload or download rates. Performance metrics captured in a laboratory setting are used to train a predictive model, such as using machine learning techniques, to predict performance of a virtual appliance based on real-time inputs, such as benchmark scores and virtual appliance settings. Predicted performance values can be used to perform a variety of actions, such as modifying resource reservation or allocation amounts for a virtual appliance or migrating a virtual appliance from one host to another. For instance, if predicted performance values for a virtual appliance indicate that the virtual appliance will consistently utilize 100% of the CPU reserved to it, then the CPU reservation amount for the virtual appliance may be increased in order to improve the performance of the virtual appliance. In another example, if predicted performance values indicate that the virtual appliance will consistently only utilize a small percentage (e.g., 50%) of the CPU reserved to it, then the CPU reservation amount for the virtual appliance may be decreased in order to ensure resource availability to other entities (e.g., other virtual appliances) and reduce latency in the system.

Furthermore, predicted performance values determined according to techniques described herein provide an accurate, real-time forecast of a virtual appliance's performance that may allow a user to utilize the virtual appliance more effectively. For instance, a given user may have a hardware configuration with more or less resources than average systems. While conventional techniques may result in the user being provided with performance numbers relevant to an average system, techniques described herein allow the user to be provided with accurate predictions that are based on the capabilities of the user's particular hardware configuration. As such, the user may be able to fine-tune virtual appliance settings based on predicted performance values in order to ensure optimal performance across the system.

It is noted that, while certain embodiments are described with respect to SDN systems, techniques described herein may also be performed in other types of systems, such as physical networking systems. Furthermore, while certain embodiments are described with respect to virtual appliances, techniques described herein may also be applied to physical appliances.

FIG. 1 illustrates components of a computing environment 100 in which embodiments of the present disclosure may be implemented. As shown, system 100 includes host 120 and lab system 130, which are connected by network 140 (e.g., the internet, a local area network (LAN), a cellular data network, or another type of network). Host 120 and lab system 130 may comprise physical computing devices (e.g., servers).

Host 120 comprises hardware platform 122 that includes a variety of hardware components, such as a central processing unit (CPU) 108, a memory 110, a network interface controller (NIC) 112, a storage component 114, and a host-bus adapter HBA 115. Host 120 further comprises a hypervisor 124, which runs virtual machines (VMs) $128_{1-n}$. Hypervisor 124 abstracts hardware resources of host 120 and serves as an interface between VMs $128_{1-n}$ and the hardware resources of host 120, which are represented by hardware platform 122. Hypervisor 124 also serves as an interface between VMs $128_{1-n}$ and VMs running on other host machines, such as lab system 130 over network 140, allowing for communication between these VMs as needed. Hypervisor 124 may include a virtual switch (not shown) which can direct network communications (e.g., network packets) between VMs 128₁₋ₙ and other entities. Virtual switches are well known in the field of machine virtualization. Each VM 128 may be addressable from physical network 140, or they may reside on an overlay network as is the case in software defined networking (SDN) deployment. Hypervisor 124 further comprises performance predictor 126, which performs operations described herein for predicting performance of virtual appliances.

Hypervisor 124 may run as system level software directly on hardware platform 122 as a "bare metal" hypervisor. In alternate embodiments, hypervisor may run on top of an operating system (not shown) in host 120. In either case, hypervisor 124 is conceptually interposed between the physical hardware and the guest operating systems executing in the virtual machines. In some implementations, the hypervisor may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc. (not shown), along with hardware drivers, may reside in the privileged virtual machine. Although the disclosure is described with reference to VMs, the teachings herein also apply to other types of virtual computing instances (VCIs), such as containers, Docker containers, isolated user space instances, namespace containers, and the like. The methods described herein for virtual machine based virtual appliances may apply to containers or other compute abstractions or even physical machines.

Lab system 130 comprises a model training engine 132, which performs operations related to training a predictive model to predict performance of virtual appliances. For example, model training engine 132 may capture performance metrics for virtual appliances with various virtual appliance settings and with various benchmark scores, train a predictive model using the performance metrics associated with the virtual appliance settings and benchmark scores, and then provide the trained predictive model to performance predictor 126 over network 140.

The predictive model may comprise a type of machine learning model, such as a Naïve Bayes, random forest, linear regression, neural network, or other type of model. Machine learning concepts generally involve using a set of training inputs and training outputs to build a model that will output a value in response to inputs. Inputs may be described as "features". For example, each training data instance may include training data inputs or features (e.g., virtual appliance settings and a benchmark score) associated with a training output (e.g., a CPU or memory utilization amount). A plurality of training data instances is used to train the model, such as by constructing a model that represents relationships between features and output values. Once trained, the model predicts an output (e.g., a CPU or memory utilization amount) based on provided input features (e.g., virtual appliance settings and a benchmark score) from a "production" system such as host 120 (e.g., as opposed to a "laboratory" system such as lab system 130 from which training data is gathered). Model training engine 132 generally gathers performance metrics for virtual appliances with different virtual appliance settings. Each instance of training data includes the measured performance metrics in association with the benchmark score and virtual appliance settings at the time the performance metrics were measured. Generally, there is a linear relationship between inputs and outputs (e.g., higher benchmark scores and virtual appliance settings that provide more capabilities are associated with higher performance values), and this relationship may be reflected in coefficients or weights within the model. For instance certain virtual appliance settings may have a greater weight in the model if they are more strongly correlated to changes in performance in the training data.

Performance predictor 126 may receive the trained predictive model from model training engine 132, such as via hypervisor 124 over network 140. Performance predictor 126 predicts performance for a virtual appliance, such as VM 128₁, by providing virtual appliance settings of the virtual appliance and a benchmark score determined for one or more components of hardware platform 122 as inputs to the predictive model. Performance predictor 126 may determine the benchmark score to provide as an input to the predictive model by using the virtual appliance (which is allocated certain amounts of hardware resources according to the virtual appliance settings) to run a benchmark program that performs a series of operations related to the function of the virtual appliance (e.g., encryption or decryption operations, read/write operations, or others) and determining how many of the operations were completed in a particular time period. The benchmark score may vary for a particular hardware component based on the virtual appliance settings for a virtual appliance, such as the CPU reservation amount. For example, larger CPU reservation amounts are likely to result in higher benchmark scores. Resource allocation amounts for virtual appliances sometimes vary over time, such as based on a load on a particular host. In some cases, determining a benchmark score may be a resource-intensive process, and so it may be beneficial to employ techniques that avoid calculating the benchmark score each time a prediction is performed.

In certain embodiments, a benchmark model is constructed at the time a virtual appliance is deployed by determining the benchmark score at a variety of different combinations of virtual appliance settings (e.g., resource reservation amounts, maximum and/or minimum resource amounts, and the like) and storing the benchmark scores in association with the respective virtual appliance settings in the benchmark model. In one example, in order to construct the benchmark model at the time the virtual appliance is deployed, performance predictor 126 runs the same benchmark program on the virtual appliance at a series of different combinations of minimum and maximum CPU amounts (e.g., CPU ranges, such as a range from 300 MHz to 400 MHz) and stores the benchmark score determined from each run in association with the range. CPU ranges may be used rather than CPU reservation amounts, for instance, to ensure that the benchmark scores in the benchmark model are not inaccurate, such as due to cases where the virtual appliance actually uses significantly more of the CPU than the amount reserved to it. CPU Accordingly, when a prediction is to be made, the benchmark score can be efficiently determined at any time based on a given CPU reservation or availability amount (e.g., which may be determined based on load) without requiring the full process for determining a benchmark score to be performed.

In other embodiments, the benchmark model may further include data related to load. For instance, when the benchmark model is generated at deployment time, benchmark scores may be calculated with a variety of different resource reservation amounts and resource load amounts, and all of this data may be stored in the benchmark model for use in determining benchmark scores at prediction time based on resource reservation and resource load amounts. This may allow for an accurate determination of a benchmark score, as including both reservation amounts and load amounts in the benchmark model accounts for dynamic conditions (e.g., load) that affect the actual CPU usage of the virtual appliance.

It is noted that multiple resources may be involved in calculating benchmark scores and generating the benchmark model. For instance, reservation amounts, minimums, maximums, and/or load amounts of CPU, memory, network resources, disk IO, GPU, and other resources may be combined in determining the benchmark score. As such, techniques described herein involving CPU amounts can also be applied to other types of resources. For example, the benchmark model may associate benchmark scores with reservation amounts and load amounts of each of a plurality of resource types. Accordingly, at prediction time, reservation and load amounts of each of these resource types may be provided as inputs to the benchmark model in order to determine a benchmark score to provide as an input to the prediction model.

Techniques described herein improve performance and reduce lag in the execution of a virtual appliance through efficient performance prediction. For example, embodiments allow for virtual appliance settings such as resource reservation amounts to be fine-tuned in real-time based on accurate performance predictions in order to optimize the functioning of a virtual appliance, reduce latency and bottlenecks, and ensure resource availability to all components that utilize system resources. In another example, virtual appliances may be migrated from one host to another based on performance predictions determined according to embodiments of the present disclosure in order to ensure optimal functioning of the virtual appliances and underlying computer hardware components.

Figure 2:
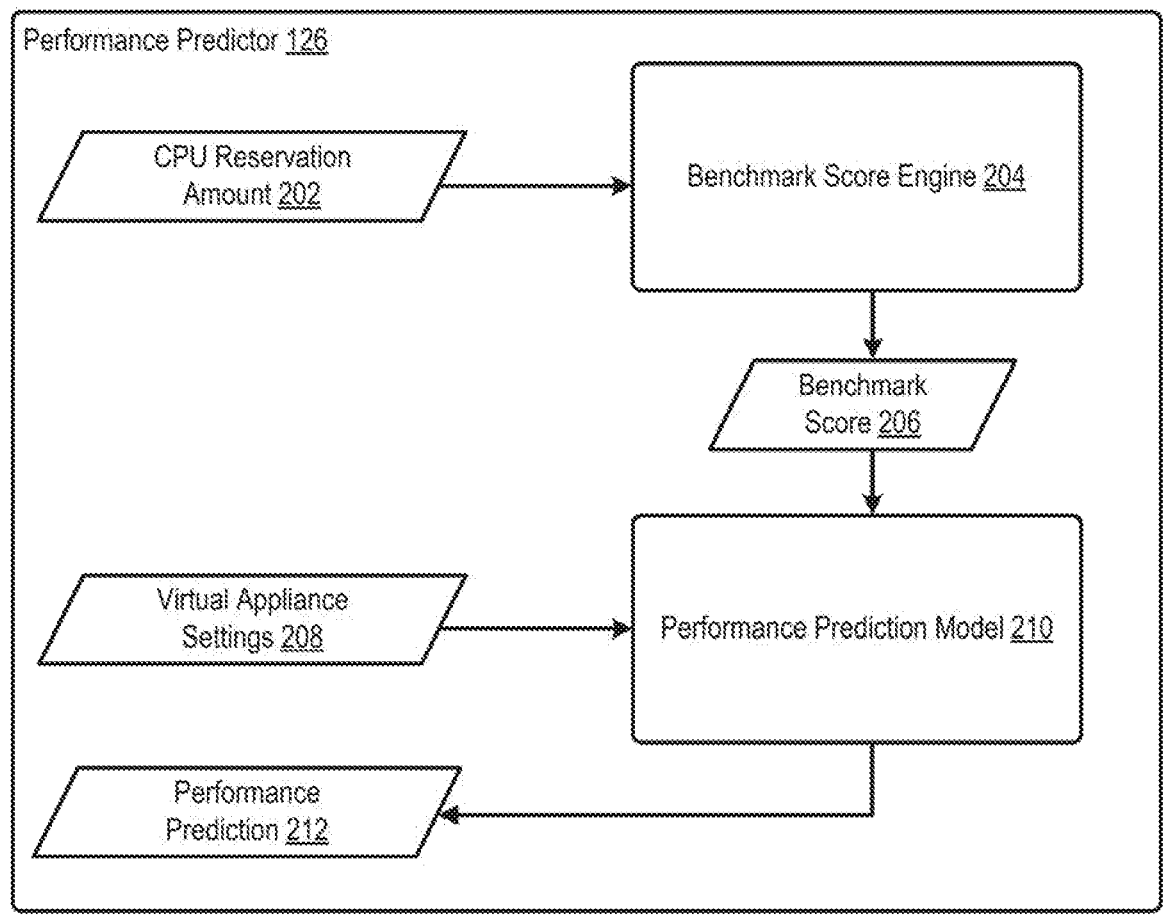
FIG. 2 illustrates an example flow of data between components of a performance predictor, according to embodiments of the present disclosure.

FIG. 2 illustrates an example flow of data between components of a performance predictor 126, which represents performance predictor 126 of FIG. 1. The data flow depicted in FIG. 2 may be performed in order to predict performance of a virtual appliance, such as one of VMs $128_{1-n}$ of FIG. 1 (e.g., which may run a service that performs encryption operations, such as an internet protocol security (IPSec) service), such as in response to a user event (e.g., a user requesting a prediction or a user initiating a configuration process for the virtual appliance). The components depicted in FIG. 2 are merely exemplary, and the functionality described as being performed by certain components may be performed by any number of local or remote components.

Figure 3:
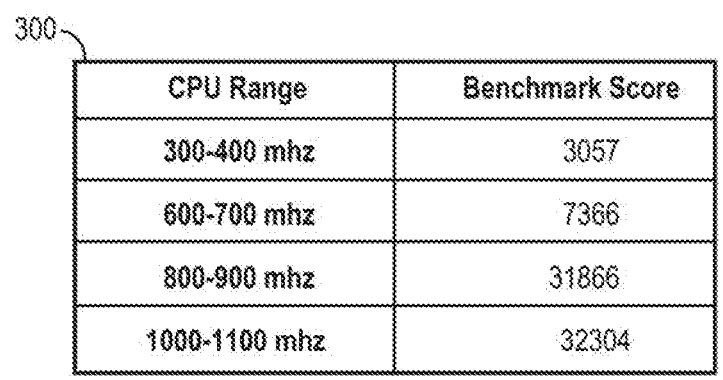
FIG. 3 illustrates an example data structure storing mappings between resource reservation amounts and benchmark scores, according to embodiments of the present disclosure.

The operation of FIG. 2 will be described in conjunction with FIG. 3, which illustrates an example benchmark model 300, which is a data structure storing mappings between resource ranges (e.g., representing minimum and maximum resource amounts in virtual appliance settings) and benchmark scores.

As shown, performance predictor 126 comprises a benchmark score engine 204 and a performance prediction model 210. Benchmark score engine 204 receives a CPU reservation amount 202 for running a virtual appliance and determines a benchmark score 206, such as based on a benchmark model 300 of FIG. 3. CPU reservation amount 202 is a VM setting maintained by the hypervisor that can be configured for the VM on which the virtual appliance runs by a systems administrator or other entity. The CPU reservation specifies a dedicated amount of physical CPU resources, which may be expressed as a CPU clock frequency, that the hypervisor allocates to the VM. In certain embodiments, benchmark model 300 has been generated at deployment time of a virtual appliance by performing a series of operations at each of a variety of different CPU ranges (e.g., by running a benchmark program on the virtual appliance with a minimum CPU amount and a maximum CPU amount set) and recording the number of operations completed within a time period for each of the CPU ranges. Benchmark model 300 therefore represents mappings of CPU ranges to benchmark scores. It is noted that, in other embodiments, benchmark model 300 may include other parameters than CPU ranges, such as CPU reservation amounts, load amounts, and data related to other resources (e.g., memory, network, disk, GPU, and others). Benchmark score engine 204 uses benchmark model 300 to determine a benchmark score 206 that is associated with CPU reservation amount 202 (e.g., the benchmark score associated with the range in which CPU reservation amount 202 falls). For example, with respect to benchmark model 300, if CPU reservation amount 202 is 300 MHz (e.g., indicating that 300 MHz of the processing resources of CPU 108 of FIG. 1 is reserved to VM $128_1$ of FIG. 1), then benchmark score 206 is 3057 (e.g., indicating that 3057 encryption operations can be performed in a time period, such as five seconds, by the virtual appliance running on CPU 108 of FIG. 1). It is noted that CPU reservation amount 202 is only included as an example input to benchmark score engine 204, and alternative or additional input may be provided, such as current load amounts, as well as data related to other types of resources.

Benchmark score engine 204 provides benchmark score 206 as an input to performance prediction model 210, which has been trained as described above with respect to lab system 130 of FIG. 1. Virtual appliance settings 208 are also provided as inputs to performance prediction model 210. For example, performance predictor 126 may retrieve virtual appliance settings 208 from a controller for the virtual appliance. Virtual appliance settings 208 include one or more user configuration values of the virtual appliance, such as a specified encryption or digest algorithm, a number of local subnets configured for the virtual appliance, a number of tunnels configured for the virtual appliance, an amount of upload and/or download bandwidth per tunnel, and other values configured by a user. Performance prediction model 210 receives benchmark score 206 and virtual appliance settings and outputs performance prediction 212.

Performance prediction 212 may comprise one or more predicted performance values for the virtual appliance, such as a CPU utilization, a memory utilization, or an upload or download rate. In one example, performance prediction 212 comprises a predicted CPU utilization (e.g., a percentage value) for the virtual appliance based on the virtual appliance settings and the benchmark score. Performance prediction 212 may be used for a variety of purposes, such as determining resource allocation amounts, migrating the virtual appliance to a different host, recommending optimal configuration values to the user, and the like. For example, if performance prediction 212 indicates that the CPU utilization will be one hundred percent of the amount currently allocated to the virtual appliance, then performance prediction 212 may be used to automatically determine a new CPU reservation amount (e.g., to allocate more CPU to the virtual appliance) or to automatically migrate the virtual appliance to a different host (e.g., a host that has more resource availability to support the virtual appliance). In some embodiments, the performance prediction 212 may be provided to the user. In other embodiments, a configuration recommendation may be provided to the user based on performance prediction 212. For instance, the user may be provided with a recommendation to increase or decrease a CPU reservation amount for the virtual appliance to a particular amount.

Figure 4:
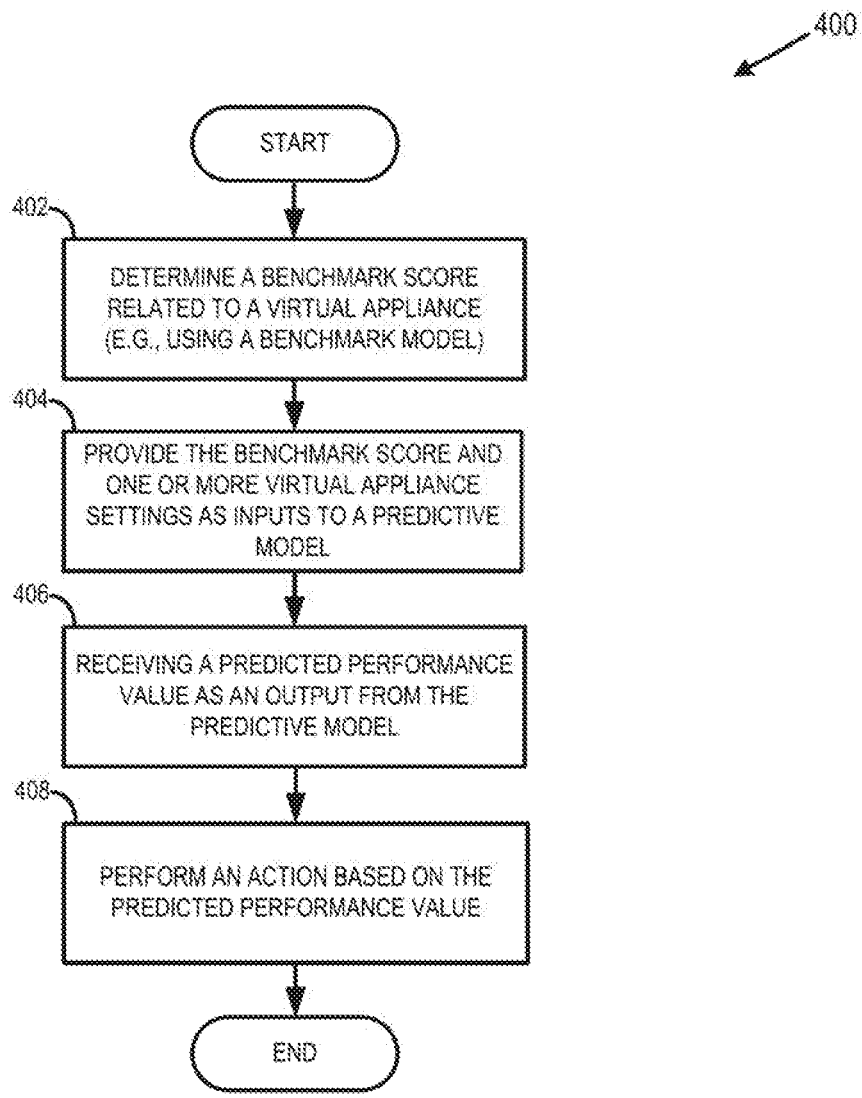
FIG. 4 illustrates example operations for predicting performance of virtual appliances, according to embodiments of the present disclosure.

FIG. 4 illustrates example operations 400 for predicting performance of virtual appliances, according to embodiments of the present disclosure. Operations 400 may, for instance, be performed by performance predictor 126 of FIGS. 1 and 2.

At 402, a benchmark score related to a virtual appliance is determined, such as using a benchmark model. For instance, performance predictor 126 of FIG. 1 may perform a series of operations using the virtual appliance with certain virtual appliance settings to determine how many operations are completed in a time period. In other embodiments, the benchmark score is determined using a benchmark model that was built at the time the virtual appliance was deployed by identifying a benchmark score corresponding to a resource reservation amount (and/or other parameters, such as load) for the virtual appliance in the benchmark model.

At 404, the benchmark score and one or more virtual appliance settings are provided as inputs to a predictive model. For example, performance predictor 126 of FIG. 1 may retrieve one or more virtual appliance settings of the virtual appliance from a controller of the virtual appliance, and may provide the virtual appliance settings along with the benchmark score determined at 402 as inputs to a predictive model which has been trained as described with respect to lab system 130 of FIG. 1.

At 406, a predicted performance value is received as an output from the predictive model. For instance, performance predictor 126 of FIG. 1 may receive the predicted performance value from the predictive model in response to providing the benchmark score and one or more virtual appliance settings as inputs at 404. In some embodiments, the predicted performance is a predicted CPU utilization or memory utilization for the virtual appliance.

At 408, an action is performed based on the predicted performance value. For example, a resource allocation amount for the virtual appliance may be automatically modified based on the predicted performance value. In another example, the virtual appliance is migrated from a first host to a second host, which may have more available resources to allocate to the virtual appliance. In another example, a notification related to the virtual appliance is provided based on the predicted performance value. For instance, the notification may comprise a recommended configuration value, such as an optimal resource reservation amount at which the virtual appliance is predicted to have improved performance. In other embodiments, the notification may comprise the predicted performance value, and a user may determine an action to perform based on the predicted performance value.

It is noted that different virtual appliances may have different predictive models. For example, a virtual appliance comprising an IPSec service may have one predictive model and a virtual appliance comprising a secure sockets layer (SSL) service may have another predictive model. As such, performance may be predicted for multiple virtual appliances separately, and the predicted performance for the appliances may be aggregated to provide combined predictions. For instance, an administrator may want to know what the predicted upload rate would be for an SSL appliance if an IPSec appliance is active. Accordingly, the two separate predictive models may be used to predict different performance values for both appliances. In one example, the predictive model for the IPSec appliance is used to predict that the IPSec appliance (e.g., at a particular benchmark score with particular virtual appliance settings) will have a CPU utilization of 30%. This value can then be used to determine a benchmark score for the SSL appliance (e.g., based on a predicted load of 30%, which affects the CPU reservation amount for the SSL appliance), and then the predictive model for the SSL appliance can be used to predict the upload rate for the SSL appliance, and this predicted upload may be provided to the administrator. CPU utilization may also be predicted for the SSL appliance based on the load from the IPSec appliance, and the two CPU utilization amounts may be aggregated to provide the administrator with an overall predicted CPU load for both appliances.

Furthermore, in cases where a single virtual appliance provides multiple services, such as IPSec & SSL VPN (virtual private network), separate predictive models may be built for each service of the virtual appliance. For instance, there may be one model generated for SSL VPN and another for IPSec. In such cases, in order to predict overall performance of the virtual appliance, the separate models may be used to predict performance of each service and then the predicted performance values of the services are aggregated. As such, a complete picture of the virtual appliance's performance may be predicted and used to determine optimal virtual appliance settings or an ideal host on which to run the virtual appliance.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in a non-transitory computer-readable medium of the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for predicting and preventing performance lag of virtual network appliances, comprising:
   determining a benchmark score for a virtual appliance running on a computing device;
   providing the benchmark score and one or more virtual appliance settings of the virtual appliance as inputs to a trained predictive model;
   receiving a predicted performance value as an output from the trained predictive model; and
   based on the predicted performance value, performing one or more actions, at least one of which is selected from the following list:
      generating a notification related to the virtual appliance;
      migrating the virtual appliance from a first host to a second host; or
      modifying a resource allocation amount related to the virtual appliance.

2. The method of claim 1, wherein determining the benchmark score for the virtual appliance running on the computing device comprises:
   using the virtual appliance to perform a series of operations on the computing device, wherein performing the series of operations comprises one of:
      performing a series of encryption or decryption operations; or performing a series of network interface controller (NIC) operations; and
   determining the benchmark score based on a rate at which the series of operations are completed.

3. The method of claim 1, wherein determining the benchmark score for the virtual appliance running on the computing device comprises using a benchmark model to determine the benchmark score.

4. The method of claim 3, wherein using the benchmark model comprises:
   determining a resource reservation amount for the virtual appliance; and
   identifying the benchmark score associated with the resource reservation amount in the benchmark model.

5. The method of claim 3, wherein the benchmark model comprises mappings between resource ranges and benchmark scores that were calculated at deployment time of the virtual appliance.

6. The method of claim 1, wherein the one or more virtual appliance settings of the virtual appliance are selected from the following list: an algorithm; a number of subnets; a number of tunnels; and an amount of bandwidth.

7. The method of claim 1, wherein the trained predictive model has been trained using historical performance metrics measured at different virtual appliance settings and with different benchmark scores.

8. A non-transitory computer readable medium comprising instructions to be executed in a computer system, wherein the instructions when executed in the computer system perform a method for predicting and preventing performance lag of virtual network appliances, the method comprising:
   determining a benchmark score for a virtual appliance running on a computing device;
   providing the benchmark score and one or more virtual appliance settings of the virtual appliance as inputs to a trained predictive model;
   receiving a predicted performance value as an output from the trained predictive model; and
   based on the predicted performance value, performing one or more actions, at least one of which is selected from the following list:
      generating a notification related to the virtual appliance;
      migrating the virtual appliance from a first host to a second host; or
      modifying a resource allocation amount related to the virtual appliance.

9. The non-transitory computer readable medium of claim 8, wherein determining the benchmark score for the virtual appliance running on the computing device comprises:
   using the virtual appliance to perform a series of operations on the computing device, wherein performing the series of operations comprises one of:
      performing a series of encryption or decryption operations; or
      performing a series of network interface controller (NIC) operations; and
   determining the benchmark score based on a rate at which the series of operations are completed.

10. The non-transitory computer readable medium of claim 8, wherein determining the benchmark score for the virtual appliance running on the computing device comprises using a benchmark model to determine the benchmark score.

11. The non-transitory computer readable medium of claim 10, wherein using the benchmark model comprises:
    determining a resource reservation amount for the virtual appliance; and
    identifying the benchmark score associated with the resource reservation amount in the benchmark model.

12. The non-transitory computer readable medium of claim 10, wherein the benchmark model comprises mappings between resource ranges and benchmark scores that were calculated at deployment time of the virtual appliance.

13. The non-transitory computer readable medium of claim 8, wherein the one or more virtual appliance settings of the virtual appliance are selected from the following list: an algorithm; a number of subnets; a number of tunnels; and an amount of bandwidth.

14. The non-transitory computer readable medium of claim 8, wherein the trained predictive model has been trained using historical performance metrics measured at different virtual appliance settings and with different benchmark scores.

15. A computer system, wherein system software for the computer system is programmed to execute a method for predicting and preventing performance lag of virtual network appliances, the method comprising:
    determining a benchmark score for a virtual appliance running on a computing device;
    providing the benchmark score and one or more virtual appliance settings of the virtual appliance as inputs to a trained predictive model;
    receiving a predicted performance value as an output from the trained predictive model; and
    based on the predicted performance value, performing one or more actions, at least one of which is selected from the following list:
        generating a notification related to the virtual appliance;
        migrating the virtual appliance from a first host to a second host; or
        modifying a resource allocation amount related to the virtual appliance.

16. The computer system of claim 15, wherein determining the benchmark score for the virtual appliance running on the computing device comprises:
    using the virtual appliance to perform a series of operations on the computing device, wherein performing the series of operations comprises one of:
        performing a series of encryption or decryption operations; or
        performing a series of network interface controller (NIC) operations; and
    determining the benchmark score based on a rate at which the series of operations are completed.

17. The computer system of claim 15, wherein determining the benchmark score for the virtual appliance running on the computing device comprises using a benchmark model to determine the benchmark score.

18. The computer system of claim 17, wherein using the benchmark model comprises:
    determining a resource reservation amount for the virtual appliance; and
    identifying the benchmark score associated with the resource reservation amount in the benchmark model.

19. The computer system of claim 17, wherein the benchmark model comprises mappings between resource ranges and benchmark scores that were calculated at deployment time of the virtual appliance.

20. The computer system of claim 15, wherein the one or more virtual appliance settings of the virtual appliance are selected from the following list: an algorithm; a number of subnets; a number of tunnels; and an amount of bandwidth.

* * * * *